United States Patent [19]

Marchal et al.

[11] 4,122,611

[45] Oct. 31, 1978

[54] APPARATUS FOR THE CONTINUOUS THERMAL TREATMENT OF A PRODUCT MOVING THROUGH AN ENCLOSED SPACE

[75] Inventors: Paul Marchal, Garches; Pierre Alvarez, St. Cloud, both of France

[73] Assignee: Air Industrie, Courbevoie, France

[21] Appl. No.: 768,862

[22] Filed: Feb. 15, 1977

[30] Foreign Application Priority Data

Feb. 19, 1976 [FR] France ............................. 76 04597

[51] Int. Cl.[2] ............................................. F26B 21/06

[52] U.S. Cl. ........................................... 34/73; 34/77; 34/155; 34/242; 68/5 E; 68/18 C

[58] Field of Search ..................................... 34/72-78, 34/242, 32, 155; 68/5 E, 18 R, 18 C; 214/17 B

[56] References Cited

U.S. PATENT DOCUMENTS

| | | | |
|---|---|---|---|
| 3,087,254 | 4/1963 | Kubodera | 34/77 |
| 3,762,065 | 10/1973 | Wahlgren | 34/73 |
| 3,798,785 | 3/1974 | Chamouton | 34/77 |
| 3,927,540 | 12/1975 | Tanaka et al. | 34/242 |

*Primary Examiner*—Kenneth W. Sprague
*Assistant Examiner*—James C. Yeung

[57] ABSTRACT

An apparatus for the continuous thermal treatment of a product within an atmosphere made up of steam (saturated or superheated) of pure water or of a mixture of air and water vapor is disclosed. The product moves through an enclosed or confined space for its thermal treatment by the steam. The space is provided with entry and exit air-locks for the conveyance of the product into the space and for its removal. There are also means for guiding the product through the air-locks and the space. Additional means is provided to encourage thermal treatment and hence the space is provided with convection, radiation or conduction means to bring heat to the product. A first condensor receives vapor or humid air which is preferably extracted from the enclosed space via the adjacent air locks; it provides heat recovery of the purged vapor from the space. A second condensor is placed within the enclosed space and communicates with the high pressure discharge port of a compressor. The compressor has its low entry port communicating to an evaporator of the first condensor. It is the second condensor which supplies to the enclosed space heat that is derived from high pressure steam, at the output of the compressor.

28 Claims, 5 Drawing Figures

APPARATUS FOR THE CONTINUOUS THERMAL TREATMENT OF A PRODUCT MOVING THROUGH AN ENCLOSED SPACE

The present invention relates to apparatus for the continuous thermal treatment of a product within an atmosphere containing steam of pure water, saturated or superheated, or a mixture of air and water vapour. The atmosphere is within an enclosed space which is provided with entry and exit air-locks for the conveyance of the product into and out of the space. There are means for guiding the product through the air-locks and space as well as means for thermal exchange, either by convection, radiation, or conduction, so as to bring to the product, when in the space, the necessary quantity of heat for its thermal treatment.

"Thermal treatment" includes all treatment of a product in an atmosphere made up of the steam of (pure) water, saturated or superheated, or in an atmosphere made up of a mixture of air and water vapour. This makes possible, for example, the vaporizing of textiles or the drying of hygroscopic products.

Such treatment exists, for example, in a process according to which the product is treated in an atmosphere of pure water steam at elevated pressures and with the atmosphere forced upon the product by convection.

Thus, in a known installation, a part of the steam circulating in the enclosed space for treatment is extracted by a compressor which raises the pressure of the steam in proportion to the internal pressure of the enclosed space. The compressed steam is introduced into an exchanger-condensor placed within the enclosed space. The steam then condenses bringing to the atmosphere of the enclosed space the heat necessary for the treatment of the product and as well compensating for various thermal losses.

The water condensed in this way is separated in a separating vessel at a controlled level, before being released into the atmosphere.

Such an installation permits a satisfactory calorific balance to be obtained, with specific consumption in the range of 0.2 to 0.4 thermal units per kg. of water evaporation. In effect, the water which evaporates from the treated product is released outside the space in liquid form instead of being released in the form of steam mixed with air, as is the case in some standard installations.

Such an installation, however, presents a certain number of disadvantages:

First of all, the water extracted from the product is released to the outside at a high temperature, which constitutes an important thermal loss in terms of calories. Moreover, the caloric balances of consumption mentioned above exist only in theory, for they can apply only in the case of an enclosed space completely air-and-water-tight.

In effect, for an enclosed space in which the product enters and leaves in a continuous fashion, it is necessary to maintain a slight pressure within the enclosed space to prevent air from entering because of the phenomena of diffusion and the differences of density between air and vapour.

Hence there is an unavoidable escape of water vapour when the product enters or leaves the enclosed area.

This escape can of course be controlled by the use of labyrinths or air-locks and by using an enclosed space in the shape of a bell.

The leaks in question lead consequently to a regulated flow, in the enclosed space, of water vapour by a supply pipe on which is placed, in theory, an automatic valve, controlled by a differential pressure regulator of the enclosed space in relation to the outside atmosphere. As a result the specific consumption balances may be bad, in view of the fact that each kilogram of steam which escapes from the enclosed space takes with it about 0.65 thermal units.

The purpose of the current invention is to correct all of these drawbacks and, in particular, to define one or some such a fashion as to allow the thermal treatment of a product in an enclosed space, the pressure of which is close to atmospheric pressure, and in an atmosphere containing either air mixed with water vapour, or saturated or superheated pure water vapour, with a very low consumption of energy.

In order to do this, a system, according to the present invention comprises, extracting from the enclosed spaces at least at the level of the air-locks previously mentioned, a certain quantity of the mixture of air and water vapour or a certain quantity of saturated or superheated pure water vapour. This mixture or vapour is then mixed together with a certain quantity of outside air coming from the air-locks. An evaporator, associated with a first condensor, receives a quantity of the before-mentioned extracted mixture or pure water vapour. A compressor with low-pressure entry is linked to the evaporator. A second condensor constituting the above mentioned means of thermal exchange is placed within the enclosed space, and is linked to the high-pressure discharge of the compressor.

A specific form of the apparatus for the continuous steam treatment of a product by steam within an enclosed atmosphere wherein the apparatus may include an enclosed space equipped with entry and exit air-locks and means for guiding the product to be treated through the air-locks and within the enclosed space, wherein the apparatus is characterized by:

(a) means for extracting from the enclosed space a quantity of steam;

(b) an evaporator within a first condensor communicating to receive said quantity of steam;

(c) a compressor having a high pressure discharge, while its low entry port communicates with the evaporator; and, (d) a second condensor mounted within the enclosed space, said second condensor communicating with the high pressure discharge of the compressor whereby the second condensor constitutes the thermal exchange device within the enclosed space to supply heat to the product in the space, and the first condensor acts as a device for the recovery of heat from the extracted steam.

The different methods of using the invention are now described below by way of example and reference to the figures appearing in the attached drawings in which.

In an effort to simplify, those elements which are identical or which fill the same function in the different embodiments are labelled by the same references.

The apparatus for continuous thermal treatment, represented by the different embodiments of the figures designated, for instance, is designed for the uninterrupted drying of a material presented in a band form, for example paper, without of course this application being exclusive or limiting.

Figure 1:
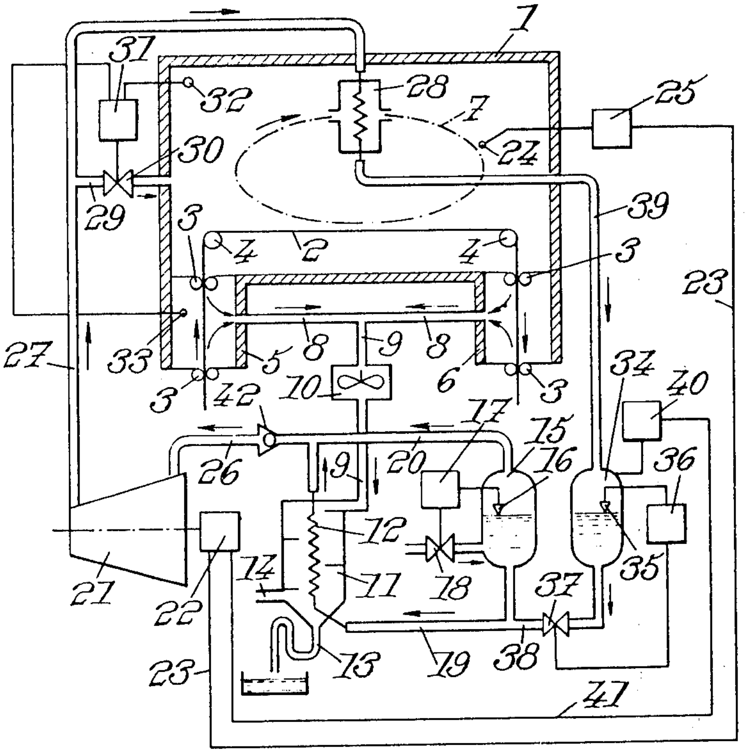
FIG. 1 represents diagrammatically, an apparatus for continuous thermal treatment of a product by convection, and in an atmosphere of pure water vapour, according to an embodiment of the invention.

Now referring to FIG. 1, treatment is carried out in a caloricly enclosed space 1 filled with steam of saturated or superheated pure water, and in which a rolled product 2 circulates continuously, passing between and along guide and return rollers, 3 and 4 respectively. The guide rollers 3 are placed in the entry and exit air-locks 5 and 6 respectively abutting and communicating with the enclosed space 1. The air-locks are equipped with deflectors or counter-parts in a standard manner. To prevent water entering or vapour escaping, due to the differences in density of air and vapour, the enclosed space 1 is preferably in the form of a bell, with the entry and exit ports for the product conveyance on the same horizontal plane, and at a lower elevation or part of the enclosed space. In any case, it is necessary to note that the air tightness between the enclosed space 1 and the air-locks 5 and 6 depend upon the nature of the product as well as the type of conveyor mechanism used.

With this in mind, product 2 is treated, in the way set out in FIG. 1, namely, by convection with pure water vapour which makes up the atmosphere of the enclosed space. In order to obtain the necessary circulation within the enclosed space, ventilators and appropriate deflectors (not shown) can be used; this circulation within the enclosed space 1 is diagrammatically represented by the flow line 7.

The thermal circuit of the embodiment of FIG. 1 has as its goal:

(1) to continuously bring into the enclosed space 1 the quantity of heat necessary for the thermal treatment of the product 2 in the most economic way possible; and, (2) to maintain the atmosphere of the enclosed space in a state of pure superheated or saturated water vapour without the addition of exterior vapour.

This thermal circuit consists of an extraction circuit 8-9 which is connected to the air-locks 5 and 6 and equipped with a fan or ventilator 10 which directly evacuates the air-locks, and indirectly evacuates the enclosed space 1 of a certain quantity of vapour, which is mixed in the air-locks with a certain quantity of air coming from the ambient atmosphere and exterior to the enclosed space. A condensor 11 having a coil 12 through which water circulates, communicates with the circuit 9 and derives humid air from the ventilator 10 which is then evaporated by condensation of its sensitive heat and specific latent heat on the coil, at a constant pressure. The condensate of the humid air is voided to the outside of the enclosed space through pipe 13 located at the base of the condensor 11. The condensate temperature is close to that of the water evaporated within the evaporator 12. Also, the excess humid air which has been saturated within the condensor 11 is released at orifice 14 thereof; it is also at an equally close temperature.

A low pressure reservoir or vessel 15 contains water, the level of which is maintained constant by a regulating circuit carrying a level detector 17 which controls the supply tap 18 of replenishing water. This reservoir 15 supplies water to the evaporator coil 12 by means of a communicating pipe 19. In addition, the upper part of the reservoir 15 communicates by a pipe 20 to the upper portion of the evaporator coil 12 in such a way as to maintain equally constant the water level within the reservoir 15. A compressor 21 is powered by a motor or prime mover 22 the speed of which is controlled by a regulation loop 23 comprising a regulator 25 and a sensor 24 mounted within the enclosed space 1 for sensing the temperature of the atmosphere thereof. The compressor 21, in operation, extracts vapour, by means of its low entry port communicating with the pipe 26 connected by means of a non-return valve 42 with the pipe 20, extending the upper (vapour) region of the pressure vessel 15 and from evaporator coil 12. Thus, the compressor extracts vapour from the evaporator coil 12 as well as from the low pressure reservoir 15 and compresses it to a high pressure and transports the pressurized vapour by means of pipe 27 to the enclosed space 1; particularly to an assembly of exchangers-condensors 28. Within the exchangers-condensors 28, part of the vapour condenses, bringing to the atmosphere of the enclosed space 1 the necessary heat required for the treatment of the product and for compensating for thermal losses. In order to make it possible to introduce vapour (and hence moisture) to the atmosphere of the enclosed space, a bleed off pipe 29 from the high pressure vapor pipe 27 communicates, through a valve 30 with the enclosed space. A differential pressure regulator 31 operates control valve 30 to the flow of vapour through the pipe 29 into the space 1. The regulator 31 receives command signals produced by differential pressure detectors 32 and 33 mounted at the upper and lower regions respectively of the enclosed space in relation to the entry air-lock 5. This regulated flow of vapour into the space 1 through the valve 30 makes certain that the enclosed space is maintained at a slightly elevated pressure from the ambient atmosphere and this tends to avoid air from entering the atmosphere of the enclosed space 1.

It is of course evident that it is advantageous to maintain the most complete air tightness possible for the enclosed space 1 and as well for the air-lock zones 5 and 6. This will have the effect of limiting the flow of vapour through pipe 29 directly into the space 1 since this bleed off of humid pressurized vapour has a considerable effect on the required size of the compresor 21 and also substantially increases the specific consumption of energy necessary to effect thermal treatment of the product 2.

The ideal is to be able to obtain a leak of vapour from the enclosed space 1 not greater than the quantity of vapour that is furnished by the product. Should the occasion arise, it is possible to maintain sufficient differential pressure within the space, without the use of the valve 30. Theoretically, the use of that valve 30 will take place solely when a diminishing evaporation (reduced evaporation) results from the product or alternatively as a result of the elimination of vapour within the space 1 altogether, as when the space is void of product or when the treatment of the product takes place without the product evaporating water. After the high pressure vapour has lost some of its latent heat in the condensor 28 the remaining vapour is drawn off by pipe 39 into high pressure reservoir 34 which contains a level of water that is maintained constant by a regulator 36 that senses the water level within the high pressure reservoir 34 via a float or level detector 35. The high pressure vessel 34 communicates with the low pressure vessel 15 through a pipe connected to its base having a control valve 37 which regulates the flow of water from the reservoir 34. The regulator 36 controls the valve 37 and hence the flow of water out of the high pressure reservoir 34. The high pressure reservoir 34 receives all of the condensates via the pipe 39 from the exchangers-condensors 28, which condensates 28 are then evacuated after an almost adiabatic expansion through the valve 37 toward to the low pressure reservoir 15. This effects a partial revaporization while maintaining a difference in pressure between the two reservoirs 15 and 34 with the aid of the compressor 21.

This arrangement is advantageous in allowing complete recuperation of the heat contained in the condensates at the saturation temperature corresponding to the pressure within the exchangers-condensors 28.

The reservoir 34 carries in addition a security pressure gate 40 linked by a conductor 41 to the motor 22. The motor 22 may thus be stopped when the pressure in the high pressure reservoir 34 rises above a predetermined threshold. It should be noted that the application of pressure within the low pressure circuit by the return of vapour is prevented by the non-return valve 42, earlier noted and placed with the pipe 26.

Figure 2:
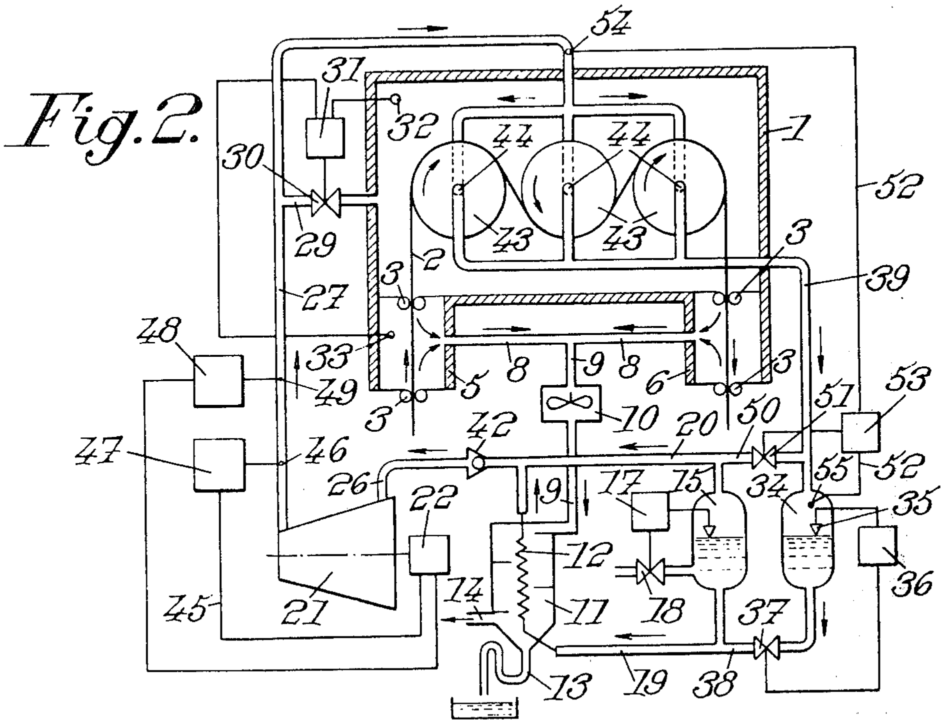
FIG. 2 represents a variation of the embodiment of FIG. 1 but wherein the thermal treatment is brought about by conduction.

The embodiment of FIG. 2 differs essentially from that of FIG. 1 by the fact that the thermal treatment of the product 2 is no longer achieved by convection, but rather, by conduction. For this reason the product 2 is passed over rotating drums 43 which rotate about hollow shafts 44, in which the vapour is condensed.

These drums also make up an ensemble of exchangers-condensors similar to that of 28. The supply of vapour coming from the pipe 27 is carried in by one of the extremities of the hollow shafts 44 through an articulating joint. The evacuation of the condensates takes place via pipe 39 which communicates to each of the other extremities of the hollow shafts. Likewise an articulating joint is used at this interface. Other means of limiting the height of the condensate within the rotating drums 43 could be effectively utilized for example a siphon or ladle.

Other differences with the earlier embodiment lie in the fact that the regulation speed of the motor 22 for the compressor 21 is ensured not by monitoring the temperature of the enclosed space as by the temperature regulator 25 but rather by monitoring the pressure through a pressure monitor 47 having a pressure sensor 46 mounted within the high pressure pipe 27 at the exit of the compressor 21. The pressure regulator is connected by a regulation loop 45 to the motor 22.

In fact, during employment of this embodiment, it is necessary to regulate the pressure of the vapour as well within the drums 43 which, during condensation, carry heat to the product through contact.

Moreover, maintaining the pressure within a predetermined threshold is assured by means of a pressure gauge 48 having a pressure detector 49 mounted in the high pressure pipe 27. The pressure gauge 48 "cuts out" the motor 22 when it receives a signal from the detector 49 indicating excessive pressure. The compressor 21 is thus stopped and rupture of the high pressure circuit is avoided.

Moreover, the high pressure vessel 34 communicates for its vapour phase, with the low pressure reservoir 15 by a communicating pipe 50 fitted with a valve 51 so that a certain volume of steam coming from the revaporization of a part of the condensate of the high pressure reservoir 34 can flow into the low pressure reservoir 15. This flow of steam has the effect of creating a pressure drop across the reservoir 34 relative to the condensor drums 43 so that the condensates can be easily evacuated from the drums 43. This flow of steam is regulated by a regulation loop 52 including a differential pressure monitor 53 and which has, on the one hand, a pressure sensor 54 mounted in the upper terminal regions of the high pressure conduit 27 and, on the other hand, another pressure sensor 55 mounted in the vapour region of the high pressure vessel 34.

As was mentioned above, the other components of FIG. 2 which play a like or identical role as similar components in the embodiments in FIG. 1 are designated by the same references.

The functioning of both embodiments of FIGS. 1 and 2 is substantially, in any event, the same.

Figure 3:
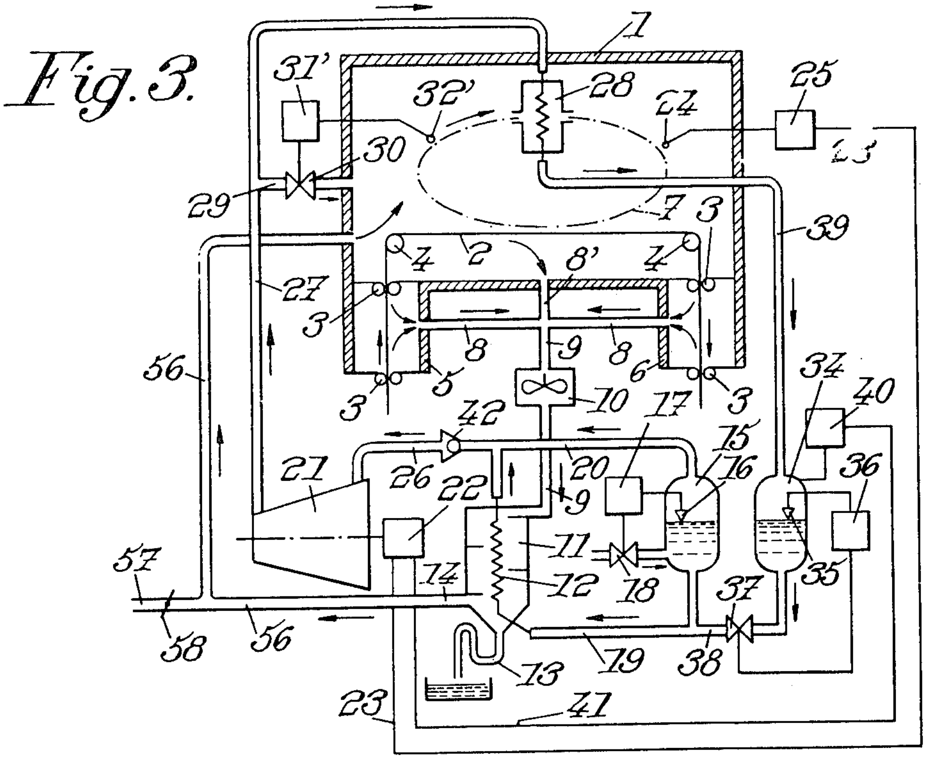
FIG. 3 represents, diagrammatically, an apparatus for the continuous thermal treatment of a product by convection within an atmosphere of mixed air and water vapour.

Referring now to the embodiment of FIG. 3, it operates differently from the two preceding ones in that the thermal treatment is brought about in an atmosphere of mixed air and water vapour. However, as in the embodiment of FIG. 1, the treatment of the product is brought about by convection.

Of course, in this case, the purpose of the embodiment of FIG. 3 is not only to bring continuously to the enclosed space 1 the quantity of heat necessary for economical treatment of a product, but also to maintain dry and humid temperature conditions in the atmosphere of the enclosed space.

Referring by comparison, with the embodiment of FIG. 1, the variation in the embodiment of FIG. 3 is as follows.

The circuit used to extract from the enclosed space 1 a certain amount of a mixture of air and water vapour may comprise pipes 8 which are connected to the air-locks 5 and 6, and in those applications where the air-lock leak-off would not be sufficient to maintain the desired moisture in the enclosed space, a supplementary pipe 8' communicating directly with the enclosed space 1. A certain amount of air coming from the outside enters the air-locks and is mixed with the moistened air coming from the air-locks and from the enclosed space.

As one extracts from the enclosed space 1 a certain amount of humid air, it is necessary to compensate for the quantity of extract by inserting humid air extract into the enclosed space 1 via a pipe 56 which communicates directly to the output port 14 of the saturated humid low temperature air eminating from the condenser 11.

A certain quantity of humid air evacuated from the condenser 11 is nevertheless released to the outside (since it is now surplus) by a pipe 57 and the regulating flow tap 58. The magnitude of the quantity of the humid air evacuated by pipe 57 compensates for the quantity of outside air that is introduced through the air-lock 5 and 6 in the enclosed space 1.

Moreover, the high pressure vapour flowing into the enclosed space as output from the compressor 21 is regulated by the valve 30 located in the pipe 29 in response to a humid temperature regulator 31' which receives a signal from a temperature detector 32' within the enclosed space 1. This flow of vapour through the pipe 29 into the enclosed space 1 makes possible the maintenance of the desirable moisture conditions necessary for the treatment of the product 2, particularly if the evaporation of the product is very low or alternatively if one wishes that the humidity of the atmosphere within the enclosed space be maintained relatively high; or alternatively for altering or varying the relative humidity within the enclosed space as when the space is void of product.

As regards the other components depicted in the embodiment of FIG. 3, as earlier mentioned, like elements bear like reference numbers.

Figure 4:
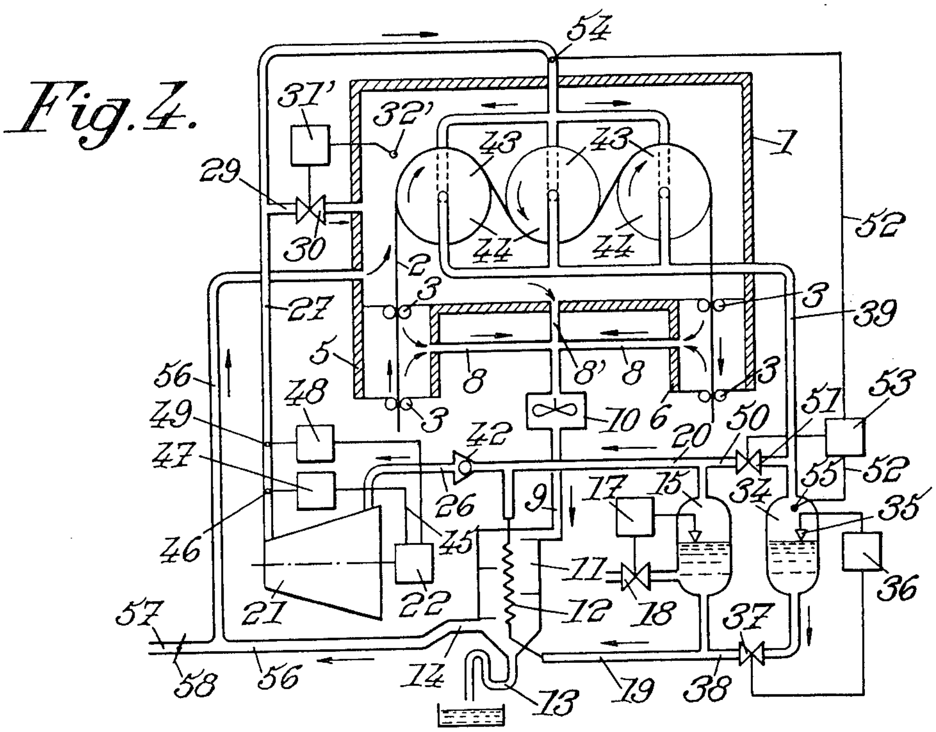
FIG. 4 represents a variation of the embodiment of FIG. 3 according to which the thermal treatment is effected by conduction.

Now referring to the embodiment of FIG. 4, as in the case of the embodiment of FIG. 3, the embodiment of FIG. 4 is designed for the thermal (drying) treatment of a product within the atmosphere, but wherein the atmosphere is a mixture of air and water vapour and the heat transfer occurs by conduction.

The object of this embodiment is also to obtain and to maintain such conditions of dry or humid temperature of the atmosphere within the enclosed space, while at the same time obtaining economic heat processing. Therefore, the elements which are coupled to the pipes 19, 20 and 39 are identical and are connected to one another in the same way as similar elements to those in FIG. 2, together with the same regulation and monitoring circuits. For the remainder, as can be clearly seen from FIG. 4, similar components and links corresponding to FIG. 2 or 3 are used.

In particular, there is a supplementary pipe 8' extracting (similar to that in FIG. 3) vapour directly from the enclosed space 1. The control of the motor 22 and hence of the compressor 21, is effected by pressure sensors 46 and 49, while the flow of steam through the pipe 29 and hence of vapour directly into the enclosed space 1, is effected by the valve 30 and its regulator 31' which has its sensor 32' within the enclosed space.

Figure 5:
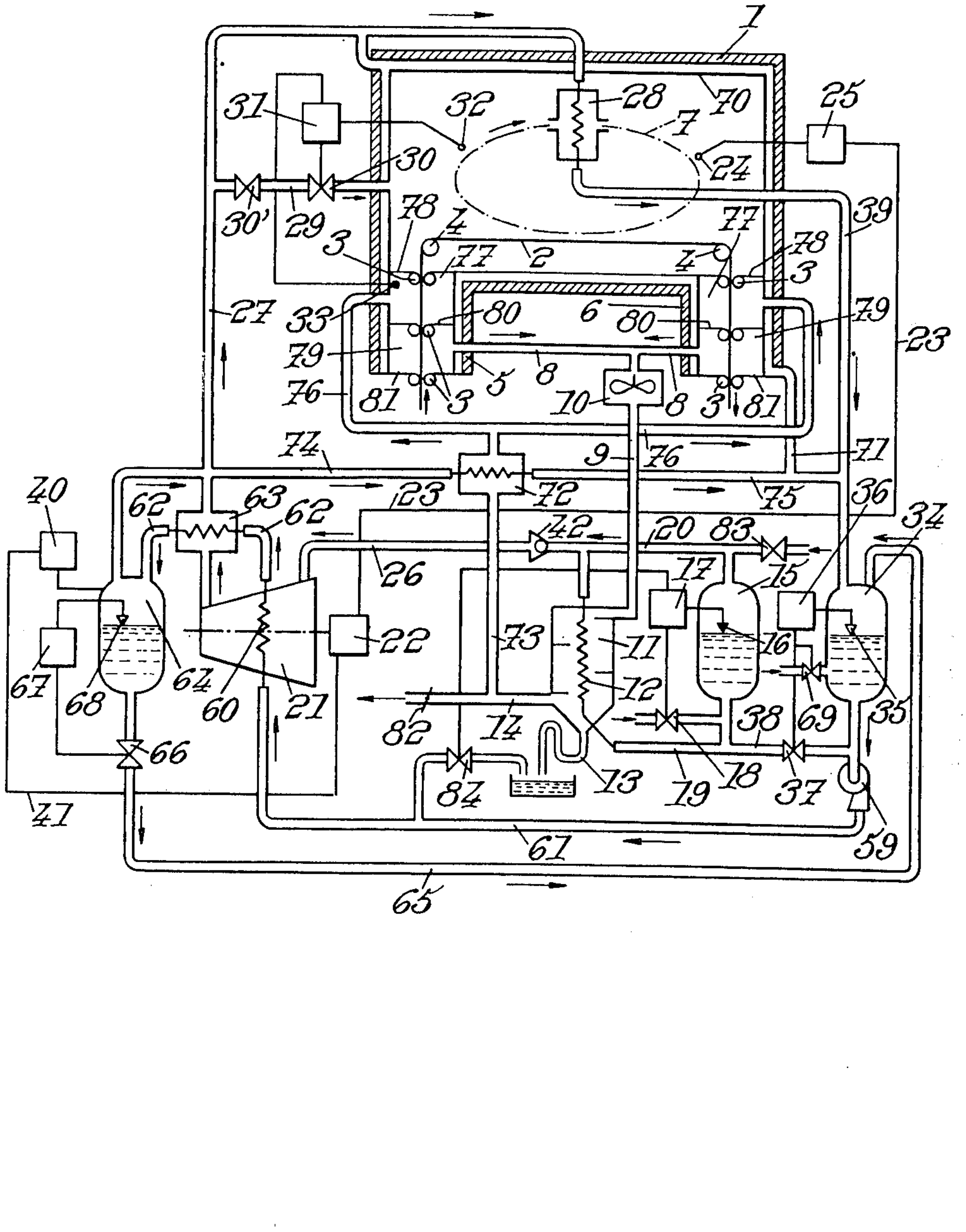
FIG. 5 represents a more complete embodiment, diagrammatically, wherein the thermal treatment of the product is by convection within an atmosphere of pure water vapour.

Now referring to FIG. 5, a further embodiment of the invention accomplishes the continuous thermal treatment of a product by convection in an atmosphere of pure water steam. As common with other figures, similar references relate to components substantially the same or fulfilling substantially the same function. As in the embodiments shown in the FIGS. 1 through 4, the function of this thermal circuit utilizes the compressor 21 connected to a source of low pressured steam, compressing the low pressured steam back into a high pressure and forcing it into the enclosed space directly as through pipe 29 and into the evaporators-condenser 28. Now the steam which is sucked into the compressor 21 is in a state of saturated steam; on compression, it is converted into a state of somewhat overheated dry steam, bearing in mind the isentropical efficiency of the compressor. One may thus observe very high temperatures of compressed steam at high pressure. For example, compressed steam in a saturated state of 0.1 absolute bar up to 6 absolute bars with an isentropical efficiency of compression of 0.7 will have enthalpy rising from 0.617 thermal units per kg. to 0.965 thermal units per kg., its temperature rising from 45° centigrade to 750° centrigrade.

One can thus appreciate the technological difficulties encountered when one tries to make a compressor function under these conditions. Moreover, the condensers 28 in which the compressed steam would need to exchange real then latent heat with the product, or with the atmosphere of the enclosed space 1, will need to be very elaborate to resist the high strains of very high temperatures of steam (and pressures), particularly in the case where these condensers are in the form of rotating drums.

It is hence preferable to de-heat the superheated steam coming from the compressor, while at the same time maintaining the compressor at a reasonable temperature.

To this, the condensates in the high pressure vessel 34 are evacuated with the aid of a pump 59. These condensates, which are at the condensation pressure of the exchangers or condensers 28 in the enclosed space, are at the saturated steam temperature under this pressure. The condensates pass through cooling circuits 60 of the compressor 21 allowing the compressor therefore, to be maintained at a temperature close to that of the condensates. In order to do this, the pump 59 is linked to these respective circuits by the pipe 61.

The heat taken away from the compressor 21 revaporizes a certain quantity of the condensates, thus insuring partial de-heating of the steam compressed by the compressor 21. The mixture of condensates and steam then passes by pipe 62, through an exchanger 63, in which the condensates are revaporized again, partially, and where the steam compressed by the compressor is de-heated, since the exchanger 63 communicates with the output of the compressor 21 and the high pressure pipe 27.

If the output of the condensates drawn from the reservoir 34 has been chosen to be sufficient so that they only partially re-vaporize, and if the exchanger 63 has been sufficiently dimensioned, the de-heating of the superheated steam can almost approach 100%. In fact on the one hand, the temperature of the steam compressed by the compressor 21 moves toward that of the condensates, in revaporization, while on the other hand, the pressure of the condensates which revaporize are only slightly higher. Because of the pump 59, the condensate temperature is in fact only slightly higher than the temperature of saturation of the compressed steam of the compressor 21.

The mixture of condensates and steam, thus coming from the exchanger 63, is carried by pipe 62 toward a separating reservoir 64.

The steam revaporized by the exchangers 60 and 63 is separated from the condensates in the reservoir 64 and is carried toward but downstream of the discharge of the compressor 21 and hence to the high pressure conduit 27, since there is an overpressure constantly maintained on the circuit by the pump 59.

The condensates are then sent back from the separating reservoir 64 toward the reservoir 34 by the communicating pipe 65. The flow of the condensates 34 is regulated by valve 66 in the response to the controller 67, which responsively reacts to a level indicator 68 mounted in the reservoir 64 to sense the level of the condensates there.

The output of the pump 59 is independent of the output of those condensates reaching the high pressure reservoir 34.

The output of the condensates taken from the exchanger circuits 64 and 63 and which de-heats the superheated steam coming from the compressor must be less or equal to that which comes from the exchangers-condensers 28 in the enclosed space. It may be that one need not observe the latter in certain cases, for example when the enclosed space is empty of product or is in a limited production stage or environment.

In order to avoid the high pressure reservoir 34 from emptying as when the flow of water (condensates) is inhibited from the reservoir 64 by valve 66, the high pressure reservoir 34 is provided with a valve 69, communicating to a water supply source. When the valve 69 is open on activation of the monitor 36 the supply valve 37 is closed.

For the purposes of avoiding condensation on the walls of the enclosed space, should one wish to maintain the atmosphere of that space as pure steam, or even as a mixture of very humid air and steam, it may be advantageous to heat the walls of the enclosed space.

Heating of the walls of the enclosed space 1 can be accomplished by means of a double insulated outside wall 70. In particular, steam is drawn from the output of the high pressure conduit 27, by means of a series of submerged channels (not shown) in the heat insulated walls of the enclosed space. The steam within the submerged channels has a tendency to condense. That condensate is returned to the reservoir 34, by pipe 71.

In the embodiments described in reference to FIGS. 3 and 4, it is possible to recycle humid air coming from the condenser 11 to the enclosed space, particularly where the enclosed space is to be maintained in an atmosphere of a mixture of air and steam in order to maintain air at a predetermined concentration therein. In the event where the atmosphere of the enclosed space 1 is made up of pure steam, this disposal is not possible.

On the other hand, in the embodiment of FIG. 5 it is advantageous to recycle humid saturated air in the air-locks 5 and 6 separating the pure vapour of the enclosed space from outside. The recycled air which eminates from condenser 11 is saturated at low temperature and is first reheated by a condenser 72 which is connected via a pipe 73 to the output 14. The condenser 72 is connected to the output of the compressor by a pipe 74 and the condensates from it are returned to the reservoir 34 by a pipe 75. This recycled air is introduced by pipes 76 into intermediary air-locks 77 where it is mixed with that steam coming from the enclosed space 1 as by escape through first barrier or labyrinth 78 separating these respective air-locks from the enclosed space 1. The mixture of air and steam thus constituted is then extracted by pipes 8 from extraction regions 79 of the air-locks which are located below the air-locks 77 after this mixture has passed through a second barrier or labyrinth 80 separating upper and lower air-locks. This mixture of air and steam mixes in the lower air-lock 79 with a certain quantity of air derived from the ambient outside atmosphere. To insure that the amount of mixture with the outside air is as least or as small as possible there is provided a third barrier or labyrinth 81 located between the lower air-locks 79 and the outside.

Thus the quantity of air with which mixture takes place in the lower air-locks 79 corresponds to that rejected to the outside at the exit of the condenser 11; that is through the exhaust port 14 and its regulating valve 82. That introduction of air from the exterior into the lower air-lock is necessary in order to avoid leakage of vapour to the outside.

The differential pressure regulator 31, which controls the steam intake to the enclosed space 1 detects that differential pressure which is present in the inside atmosphere of the enclosed space, on the one hand, and on the other hand, in the intermediary air-lock 77 where the entry of humid and reheated air is accomplished. This insures that there is no introduction of outside ambient air directly into the enclosed space 1.

The advantage of such device is to make it possible to avoid condensation within the air-locks which would otherwise occur through a mixture of cold air and pure steam. This also augments the differential pressure of the enclosed space relative to the outside with an equal amount of steam escaping into the entry air-lock. In fact, the amount of humid air recycled and added to the vapour of the enclosed space, must cross the barrier or labyrinth 80 situated between the upper and lower air-locks 77 and 79. This has the effect of elevating the pressure in the upper air-lock relative to the lower air-lock, while the lower air-locks have a pressure slightly less than that of the outside air.

The reservoirs 15 and 34 are automatically filled by the action of the regulators 17 and 36, respectively acting on valves 18 and 69 to bring in new water. Reservoir 64 fills as soon as pump 59 is put into service.

The heating process of the atmosphere of the enclosed space 1, when it is empty of product, is accomplished first of all, without an intake of steam into the enclosed space, tap or valve 30' being closed manually to avoid condensation. Ventilator 10 and the mixing ventilators (not shown) in the enclosed space are then put into service and thereafter compressor 21.

The entry of outside vapour must be foreseen and is regulated by a valve 83 which is open before the starting of the compressor 21 so that vapour is fed as soon as the pump 59 is put into operation. Since the atmosphere of the enclosed space is made up of air there is, initially, negligible recuperation of the heat in the condensor 11.

The compressor 21 begins to discharge steam at a high pressure which condenses in the ensemble of exchangers-condensors 28 and also within the walls 70 of the enclosed space, and also in the condensor 72 which recovers condensates to the high pressure reservoir 34, through conducts 39, 71 and 75.

Because of the initial entry of exterior vapour into the circuit, it is necessary to evacuate the water from the circuit. This is possible by opening valve 84, communicating with pipe 61, to drain the extracted condensates pumped from the high pressure reservoir 34 by the pump 59. The valve 84 remains open in response to the regulator 17, after the valve 18, which brings in supply water, is closed.

Manual cleaners are provided in the reservoirs 34, 64 and 15 so as to eliminate air from the circuit as by sweeping of the vapour brought into it from the outside.

As soon as the atmosphere of the enclosed space is brought up to the temperature controlled by the regulator 25 the manual valve 30' is opened so as to permit vapour to be injected, under the control of valve 30, directly into the enclosed space 1.

The automatic purging of the air contained in the enclosed space 1 is then carried out by the air-locks 79 situated at the bottom part of the space 1 and also by the humid air extraction pipe 8 which is connected to them and communicates to the ventilator 10. The manual valve 83 which initially carries vapour, is then closed again as soon as the humid air is sufficient to permit recuperation of sufficient heat in the condenser 11 to maintain the circuit. To do this, a humidity indicating thermometer can be placed within the enclosed space.

It has been found that specific consumption bearing between 0.2 and 0.4 thermal units per kg. of evaporated water can be maintained easily with these circuits in the drying application of hygroscopic products; the specific consumption will vary according to the nature of the product, its conditions of treatment and the means of conveyance.

This consumption is of the same order or magnitude as that obtained by conventional devices without the necessary adherent constriction or restrictions to those methods. In this way the embodiments of the invention appear to have a broader and more general usage.

Further, in the thermal treatment of a product by radiation, which has not been fully described above, it can be considered that the same is yet but a simple variant of the thermal treatment as by convection described herein in reference to FIGS. 1, 3 and 5 but wherein the condensor 28 brings heat directly to the product by radiation rather than by convection or conduction.

We claim:

1. Apparatus for the continuous thermal treatment of a product by steam comprising an enclosed space equipped with entry and exit air-locks, means for guiding the product to be treated through the air-locks and within the enclosed space, a thermal exchange device within the enclosed space to supply heat thereto, means for simultaneously extracting from the enclosed space a quantity of steam and a quantity of air from the air-locks and mixing the same, a first condensor having an inlet communicating with said extraction means to receive and condense said mixture, an evaporator associated with said first condensor having an entry port connected to a source of water and a vapor outlet port, a compressor having a low pressure entry port communicating with the vapor outlet of said evaporator and a high pressure discharge port; and, said thermal exchange means comprising a second condensor mounted within the enclosed space having an entry port communicating with the high pressure discharge port of the compressor, and an outlet port communicating with the source of water.

2. The apparatus as claimed in claim 1 including a high pressure reservoir communicating with the second condensor, for receiving condensates therefrom, and a flow valve communicating with the liquid phase region of the high pressure reservoir on the one hand, and the evaporator on the other.

3. The apparatus according to claim 2 including means for regulating the liquid level in the high pressure reservoir and means for controllably venting the high pressure reservoir.

4. The apparatus according to claim 2 including a low pressure reservoir and means for supplying additional liquid to the low pressure reservoir, the said low pressure reservoir communicating for its liquid phase, with the entry port of the evaporator, and communicating its vapour phase with the entry port of the compressor.

5. The apparatus according to claim 2 including a low pressure reservoir and means for supplying new liquid to the low pressure reservoir, the reservoir communicating, for its liquid phase, to the entry port of the evaporator, and for its vapour phase with the entry port of the compressor and having means for regulating the liquid level thereof.

6. The apparatus according to claim 2 including means for communicating the high pressure discharge port of the compressor directly to the interior of the enclosed space, and means for regulating the flow of compressed vapour from the high pressure discharge port into the enclosed space.

7. The apparatus according to claim 2 including means communicating the discharge port of the compressor with the interior of the enclosed space and means for regulating the flow of compressed vapour from the high pressure discharge port into the enclosed space, means for circulating the atmosphere of the enclosed space over the product resting within the enclosed space and means for regulating the speed of the compressor in response to a temperature detecting means mounted within the enclosed space for detecting the temperature thereof.

8. The apparatus according to claim 2 including a security control means for controlling the speed of the compressor and a pressure detector mounted in the high pressure reservoir for detecting the pressure therein and for communicating the pressure to the security control means whereby in response to the pressure in the high pressure reservoir exceeding a predetermined threshold, the compressor is stopped.

9. The apparatus according to claim 2 including a low pressure reservoir, means for supplying additional liquid to the low pressure reservoir, the said low pressure reservoir communicating its liquid phase, with evaporator and communicating its vapour phase with the entry port of the compressor, a pipe communicating the vapour phase of the high pressure reservoir with that of the low pressure reservoir and means for regulating the flow of the vapour through said pipe from the high pressure reservoir to the low pressure reservoir and to the entry part of the compressor.

10. The apparatus according to claim 2 including a low pressure reservoir, means for supplying additional liquid to the low pressure reservoir, the said low pressure reservoir, communicating its liquid phase, with the evaporator and communicating its vapour with the entry port of the compressor, a pipe communicating the vapour phase of the high pressure reservoir with that of the low pressure reservoir, means for regulating the flow of the vapour through said pipe from the high pressure reservoir to the low pressure reservoir and the entry port of the compressor and a differential pressure regulator for controlling the flow of vapour from the high pressure reservoir to the low pressure reservoir, said regulator receiving differential signals responsive to sensors mounted on the one hand, in the high pressure reservoir, and on the other hand, in the second condensor.

11. The apparatus as claimed in claim 2 including a plurality of rotating drums mounted within the enclosed space over which the product can pass in juxtaposition therewith, the said drums defining the said second condensor, a pipe communicating the vapour phase of the high pressure reservoir with that of the low pressure reservoir, means for regulating the flow of vapour through said pipe from the high pressure reservoir to the low pressure reservoir, a differential pressure regulator for controlling the regulating means said pressure regulator receiving differential signals from pressure sensors mounted, on the one hand, in the high pressure reservoir, and on the other hand, in that region of the rotating drum defining the second condensor.

12. The apparatus according to claim 2 including means for communicating the high pressure discharge port of the compressor directly to the interior of the enclosed space, means for regulating the flow of the compressed vapour from the high pressure discharge port into the enclosed space in response to a differential pressure regulator adapted to receive as signals, a signal from a pressure responsive detector mounted within the enclosed space, and a signal from a pressure responsive detector located in the entry air-lock.

13. The apparatus according to claim 2 including means for communicating the high pressure discharge port of the compressor directly to the interior of the emclosed space means including a temperature sensor mounted in the enclosed space by which the temperature in the enclosed space is sensed and means for regulating, in response to that sensor, the flow of compressed vapour through the communication means into the enclosed space from the high pressure discharge port.

14. The apparatus according to claim 2 wherein the compressor is provided with a cooling circuit for cooling the compressor said circuit communicating to the liquid condensates in the high pressure reservoir, on the one hand, and on the other hand, to a high pressure separating balloon for recuperating the condensates after they have passed through the compressor.

15. The apparatus as claimed in claim 1 including a plurality of rotating drums mounted within the enclosed space over which the product can pass in juxtaposition therewith, the said drums defining the said second condensor.

16. The apparatus as claimed in claim 1 including a plurality of rotating drums mounted within the enclosed space over which the product can pass in juxtaposition therewith, the said drums defining the said second condensor, a pressure detector mounted in the rotating drums for measuring the pressure of the vapour discharged by the compressor into the rotating drum and for variably controlling the speed of the compressor in response thereto.

17. The apparatus as claimed in claim 1 including a plurality of rotating drums mounted within the enclosed space over which the product can pass in juxtaposition therewith, the said drums defining the said second condensor, a monitor means including a pressure detector mounted in the rotating drums for measuring the pressure of the vapour discharged by the compressor into the rotating drum and for variably controlling the speed of the compressor in response thereto below a predetermined maximum speed.

18. The apparatus according to claim 1 including an exchanger communicating with the high pressure discharge port of the compressor, the exchanger communicating on the one hand with the liquid phase of the high pressure reservoir by which condensates are conveyed to the exchanger, and on the other hand, linked to a high pressure balloon for recuperating the said condensates.

19. The apparatus according to claim 1, including an exchanger communicating with the high pressure discharge port of the compressor, the exchanger communicating on the one hand with the liquid phase of the high pressure reservoir by which condensates are conveyed to the exchanger, and on the other hand, linked to a high pressure balloon for recuperating the said condensates, wherein said separating balloon communicates its condensates to the high pressure reservoir and means for returning the condensates in the balloon back to the high pressure reservoir.

20. The apparatus according to claim 1, including an exchanger communicating with the high pressure discharge port of the compressor, the exchanger communicating, on the one hand, with the liquid phase of the high pressure reservoir by which condensates are conveyed to the exchanger, and on the other hand, linked to a high pressure balloon for recuperating the said condensates, wherein said separating balloon communicates its condensates with the high pressure reservoir and returns those condensates to the high pressure reservoir and means responsive to the level of liquid condensates in the balloon for controlling the flow of condensates from the balloon back into the high pressure reservoir.

21. The apparatus according to claim 1 including conduit means mounted on the internal portions of the walls of the enclosed space, said conduit means communicating with the high pressure discharge port of the compressor whereby compressed vapour, therefrom, is conveyed simultaneously to the second exchanger-condenser and the conduits along the walls so as to eliminate condensation on the interior of said walls.

22. The apparatus according to claim 1 including means communicating with the first condenser for evacuating the low pressure saturated air from said first condenser and for communicating it to the enclosed space.

23. The apparatus as claimed in claim 1 including a pipe communicating with the first condenser and for conveying the low pressure saturated air from that condenser into an air-lock.

24. The apparatus as claimed in claim 1 including a conduit means communicating between, on the one hand, the first compressor, and on the other hand, the enclosed space and an air-lock, so as to convey low pressure saturated air from the first condenser into the enclosed space and the air-lock.

25. The apparatus according to claim 1 including conduit means mounted along the internal regions of the walls of the enclosed space, said conduit means communicating with the high pressure discharge port of the compressor, whereby the compressor vapour therefrom is conveyed simultaneously to the second exchanger-condenser and the conduits so that condensation may be eliminated from the internal surfaces of the walls of the enclosed space, and means including a heat exchanger for reheating the said low pressure saturated air prior to its entry into the enclosed space.

26. The apparatus as claimed in claim 1 including a pipe communicating with a first condenser and for conveying the low pressure saturated air from that condenser into an air-lock and means including a heat exchanger for heating the low pressure saturated air prior to its entry into the air-lock.

27. The apparatus as claimed in claim 1 wherein each air-lock is subdivided into two abutting sub-air-locks, on sub-air-lock superadjacent to the other, and including barrier means disposed between the sub-air-locks with the enclosed space, and with the outside, and a pipe means communicating between the first condenser and the sub-air-locks for conveying to each superadjacent air-lock, low pressure saturated air eminating from the first compressor.

28. The apparatus as claimed in claim 1 including a pipe communicating with the first condenser and for conveying the low pressure saturated air from that condenser into an air-lock, means in said pipe including a heat exchanger, for heating the low pressure saturated air prior to its entry into the air-lock, pressure sensors mounted in the enclosed space and in the air-lock and means for monitoring the differential pressure between the enclosed space and the air-locks and for controlling the flow of high pressure vapour from the high pressure discharge port of the compressor into the enclosed space.

* * * * *